April 24, 1956 G. C. SZIKLAI 2,743,356

TUNABLE FREQUENCY SYSTEMS OF CONSTANT BAND WIDTH

Filed June 25, 1949 2 Sheets-Sheet 1

INVENTOR
GEORGE C. SZIKLAI
BY
ATTORNEY

TUNABLE FREQUENCY SYSTEMS OF CONSTANT BAND WIDTH

Filed June 25, 1949 2 Sheets-Sheet 2

INVENTOR
GEORGE C. SZIKLAI
BY
[signature]
ATTORNEY

United States Patent Office 2,743,356
Patented Apr. 24, 1956

2,743,356

TUNABLE FREQUENCY SYSTEMS OF CONSTANT BAND WIDTH

George C. Sziklai, Princeton, N. J., assignor to Radio Corporation of America, a corporation of Delaware Application June 25, 1949, Serial No. 101,389

16 Claims. (Cl. 250—20)

The present invention relates to electrical signal translation systems having a tunable frequency acceptance characteristic with constant selectivity or bandpass over their entire tunable range.

In more particularity, the present invention concerns itself with tunable bandpass amplifiers having substantially constant bandpass over all of its tunable range.

There is constantly arising in the communications art, the need for simple electrical circuits having constant selectivity over a relatively wide range of signal frequencies. For instance, in the design of television receivers, it is presently desirable to provide some means for selectively accepting 13 transmitted television channels covering the range from 54 to 216 megacycles. Yet throughout this range, it is necessary to provide a substantially constant acceptance frequency bandwidth of approximately only 6 megacycles.

As will be realized by those skilled in the art, requirements of this type are no more severe than the selectivity requirements demanded by many other branches of the communication art and do represent a major problem, especially when operation is at these higher frequencies.

It is therefore a purpose of the present invention to provide an improved form of tunable network design which permits constant bandwidth or selectivity characteristics to be exhibited over a rather wide tunable range.

It is still a further purpose of the present invention to provide a new and improved form of tunable amplifier, particularly adapted for use in higher signal frequencies and exhibiting a substantially constant bandwidth or selectivity characteristics over its entire useful tuning range.

It is still another purpose of the present invention to provide a novel form of tunable amplifier arrangement imminently suitable for application in radio receiving equipment wherein it is desirable to maintain a substantially constant acceptance bandwidth over the entire range of receiver tuning frequencies.

Other features and advantages will be apparent from the following description of the invention when considered in connection with the accompanying drawings in which.

Figure 1:
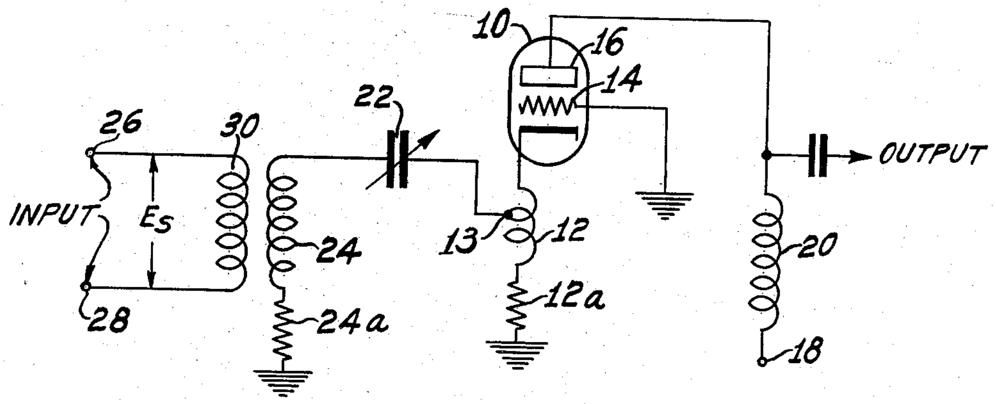
Figure 1 illustrates by circuit diagram one form of the present invention as applied to an electronic signal amplifier.

Referring now to Figure 1, there is shown the vacuum tube 10 having cathode impedance 12 and its grid 14 connected with ground potential in a typical grounded grid amplifier type of connection. Suitable anode polarizing potential for the anode 16 is derived from a source of positive potential at terminal 18 through a load impedance 20, across which is developed an output signal for coupling to a signal utilizing means.

According to the present invention, the cathode impedance 12 of the grounded grid amplifier tube 10 is usually made sufficiently inductive to exhibit a very high reactance at the amplifier operating frequency so that the impedance across its terminals is substantially equal to the cathode impedance of the tube $1/g_m$ where $g_m$ is the mutual conductance of the tube. This impedance is then shunted in part by the series combination of a variable capacitor 22 and inductance 24, connected with the tap 13 of the inductance 12. Input signals, applied to input terminals 26 and 28 of the winding 30, are then inductively coupled into the series resonant circuit formed by the inductance 24, the variable capacitance 22, and the inductance 12. As will be appreciated, resonant signal currents flowing in this series resonant circuit will constitute a current flow through the inductance 12 which is common to the cathode circuit, the grid, and anode circuit of the vacuum tube. Since the anode impedance 20 is in practice considerably higher than the cathode impedance of the amplifier stage, a substantial voltage gain will be realized from the input circuit to the output circuit of the grounded grid amplifier stage. By varying the value of the capacitor 22, it is obvious that the resonant frequency of the series tuned circuit may be altered or tuned over any desirable range and thereby change the value of signal frequency to which the amplifier displays maximum response.

Figure 2:
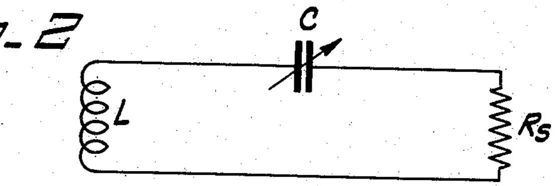
Figure 2 is a schematic representation of certain basic elements involved in the operation of the present invention.

The novel arrangement of the present invention makes it possible to so proportion the components of the series resonant circuit that the amplifier as a whole expresses a constant bandpass or selectivity characteristic over its entire tunable range. This comes about by way of the fact that the bandwidth of the circuit is directly related to the Q of the series resonant circuit formed by the inductance 24, capacitance 22; the impedance across inductance 12 which, as noted, comprises in most part the resistive cathode impedance of the tube 10 which is approximately equal to $1/g_m$. The inductance elements 12 and 24 may have respective resistive components **12*a* and 24*a*. Component 12*a* of course will affect little more than the D. C. bias on the tube 10 while component 24*a*** will actually enter into determining the effective circuit Q. The series resonant circuit may be represented by the schematic diagram shown in Figure 2 where L represents the total inductance in the series resonant circuit, C represents the variable capacitor 22 and $R_s$ is equivalent to the total series resistance in the resonant circuit which, of course, includes resistance component 24*a*, as well as the resistive component of the tube cathode impedance and any other losses encountered in the capacitor or wiring.

As is shown on page 145 of the first edition of the Radio Engineers' Handbook by Terman, published by McGraw Hill Book Co., Inc., 1943, the bandwidth $\Delta f$ of the resonant circuit (which is equal to the difference between the two frequencies at which the resonant circuit displays 70.7% of its resonant impedance) to the center or resonant frequency of the circuit is equal to the reciprocal of the circuit Q. That is:

$$\frac{\Delta f}{f_0}=\frac{1}{Q} \quad (1)$$

but the Q of the circuit is equal to:

$$\frac{\omega_0 L}{R_s}$$

(Terman Loc. cit.)

where $\omega_0=2\pi f_0$, $f_0$ being the resonant frequency of the series resonant circuit for particular setting of the variable capacitor C. Therefore, we may write (2) $$\frac{\Delta f}{f_0}=\frac{R_s}{\omega_0 L}=\frac{R_s}{2\pi f_0 L}$$

both sides of which may be multiplied by $f_0$ to yield (3) $$\Delta f=\frac{R_s}{2\pi L}$$

It may thus be seen that the novel arrangement of the present invention permits the bandwidth $\Delta f$ of the amplifier to be independent of the setting of the capacitance so that no matter to what center frequency the resonant circuit is tuned, the bandwidth will be constant.

From this it may also be seen that the control of the amplifier bandpass may be had by simply adjusting the effective series resistance in the circuit or the value of the inductance 24. Evidently, varying the value of the circuit inductance will require a suitable change in the range of the variable capacitor to yield the same tuning range for the amplifier. In some instances, it is found that a simple choke may be used for the cathode impedance 12.

In the practice of the present invention, should it be desirable to obtain a rather high selectivity such, as for example, required in the television R. F. amplifiers or tuners, it becomes obvious from the above Expression 3

(4) $$\Delta F=\frac{R_s}{2\pi L} \text{ or } R_s=\Delta F 2\pi L$$

that the effective resistance in the series resonant circuit must be kept relatively low. The required value of $R_s$ (see Figure 2) may be found conveniently by substituting for L in Equation 4 the reciprocal of the product of the minimum capacitance $C_{min}$ and the square of the maximum angular frequency $\omega_{max}$ to which the circuit is to resonate. That is, at the highest angular frequency of resonance, $\omega_{max}$ $$\omega_{max} L=\frac{1}{\omega_{max} C_{min}} \text{ or } \frac{1}{\omega_{max}^2 C_{min}}=L$$

substituting in Equation 4 then (5) $$R_s=\frac{\Delta\omega}{C_{min}\,\omega_{max}^2}$$

In the arrangement of Figure 1, this resistance $R_s$ may be thought of as comprising the cathode impedance $R_c$ of the grounded grid amplifier which may be computed from $$R_c=\frac{r_p+ZL}{1+\mu}$$

where:

$r_p$=plate resistance of the tube
$ZL$=actual load impedance in the anode circuit
$\mu$=amplification factor of the tube It will be found that for conventional values of ZL, this value of $R_c$ will be much greater than the required value of $R_s$ for an exemplary bandwidth of 6 megacycles at a signal frequency of 213 megacycles as is desired in present-day television receiver design. Hence, need is indicated for an impedance step down from the cathode circuit of the tube to the series resonant input circuit. This may be accomplished by either transformer coupling the cathode circuit of the tube 10 to the resonant input circuit or by tapping down on the cathode impedance, the connection of the resonant input as shown at tap 13 in Figure 1. The desirable transformation ratio N $$N=\sqrt{R_c/R_s}$$

may be expressed in terms of the frequencies involved by substituting for $R_s$ its value from Expression 5 above, thus $$N=\omega_{max}\sqrt{\frac{R_c C_{min}}{\Delta\omega}}$$

indicating a transformation ratio of approximately 6 to 1 for a top frequency of 213 mc., a minimum tuning capacitance of 4 mmf., a cathode impedance of 180 ohms and a bandwidth of 6 mc.

Figure 3:
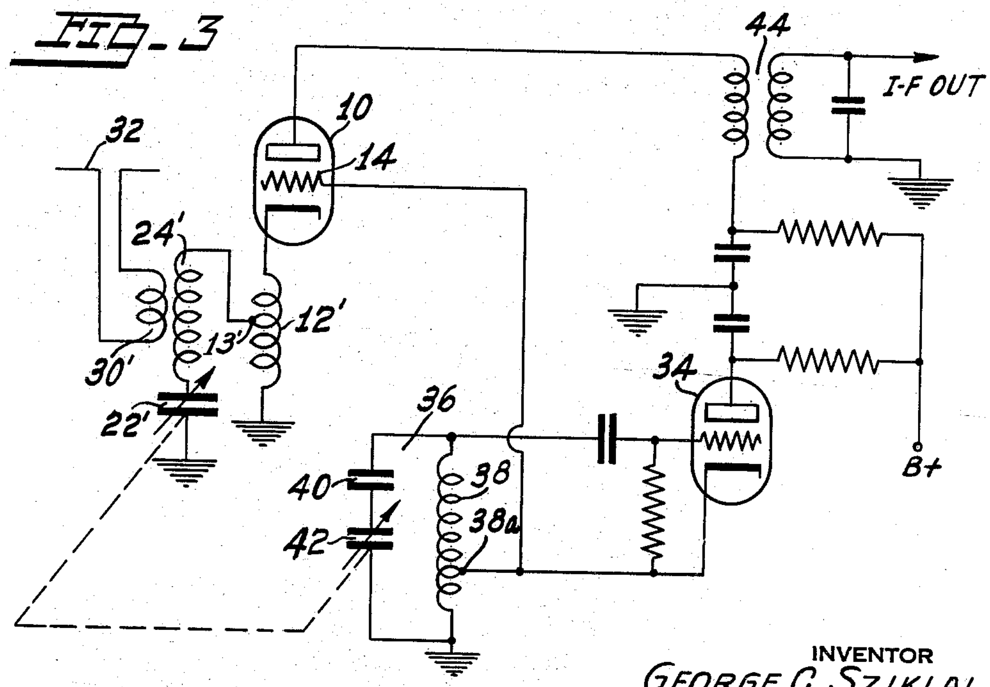
Figure 3 shows by circuit diagram an embodiment of the present invention as applied to a superheterodyne type of signal detector.

The present invention may be also advantageously applied to R. F. tuners or converter stages for radio receivers such as, for example, shown in Figure 3. Here incoming signals are intercepted by the antenna 32 and inductively coupled to the inductance 24' by the coil 30'. The inductance or choke 12' is placed in the cathode circuit of the grounded grid converter tube 10 in a manner similar to the straight grounded grid amplifier of Figure 1.

The value of the inductance 24' is established in accordance with the effective series resistance in the series resonant circuit so as to obtain a predetermined bandwidth for the amplifier arrangement. After having established the proper value of inductance 24', the range of the tuning capacitor 22' is determinable for tuning the input circuit over the desired range of frequencies.

In order to achieve superheterodyned mixing action, a source of local oscillator signal is supplied by the vacuum tube 34, connected as a well-known Hartley oscillator. The operating frequency of the oscillator is, of course, established by the resonant frequency of the tank circuit 36 comprised of the tapped inductance 38 and the capacitors 40 and 42. Capacitor 42 is made of the variable type and is appropriately ganged and tracked with the tuning condenser 22' of the converter input circuit so as to provide a suitable output intermediate frequency across the secondary of the transformer 44. Oscillator signal is mixed with the incoming radio signals in the amplifier tube 10 by returning the control electrode 14 thereof to the tap 38a on the inductance 38 so that a portion of the oscillator voltage appearing across the oscillator tank circuit is applied to the control electrode.

Figure 4:
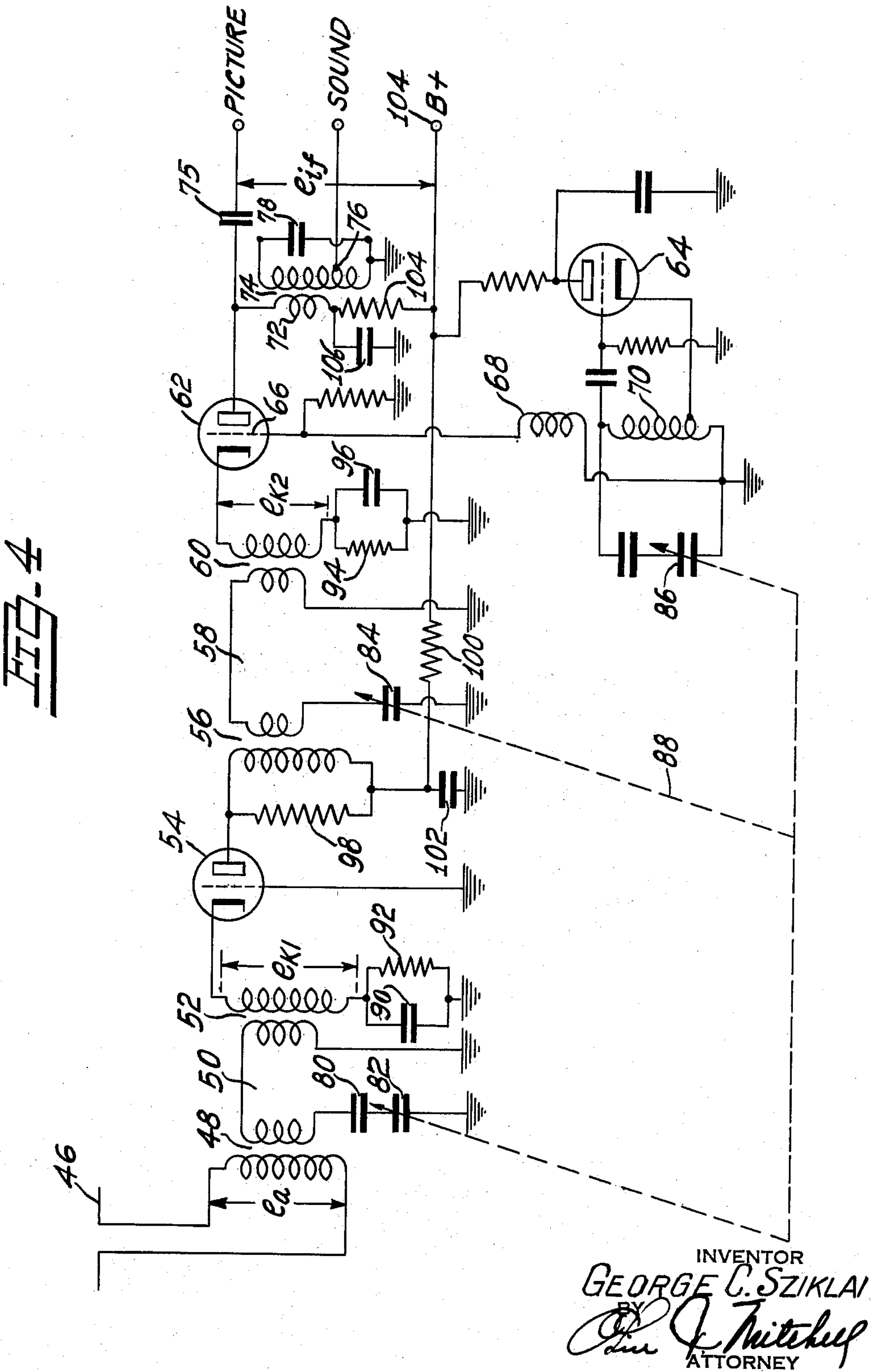
Figure 4 illustrates by circuit diagram this invention in still another of its forms.

The arrangement in Figure 4 shows the present invention applied to a typical television receiver tuner unit whose bandwidth may be designed to be substantially a constant 6 mc. over the entire television spectrum extending from 54 to 216 mc. The signal $e_a$ intercepted by the antenna 46 is transformer coupled by means of the step-down transformer 48, through the series resonant circuit 50 and through the step-up transformer 52 into the cathode circuit of a grounded grid amplifier 54. The signal developed in the plate circuit of the grounded grid amplifier 54 is then transformed down by transformer 56 to a low impedance suitable for energization of the series resonant circuit 58 which is further coupled by means of step-up transformer 60 to the anode-cathode circuit of the grounded grid type mixer 62. Superheterodyne oscillator voltage is then developed by the local oscillator vacuum tube 64 employed in a typical Hartley oscillator connection. The grid 66 of the grounded grid mixer 62 instead of going directly to ground, as in the case of tube 54, is instead connected to ground through the pick-up coil 68 magnetically coupled with the tank circuit inductance 70 of the Hartley oscillator. Intermediate frequency signal ($e_{if}$) is consequently developed across the primary 72 of the first I. F. transformer 74. Video or picture I. F. may be taken directly from the anode extremity of the I. F. transformer primary 72, while sound may be extracted from a tap 76 on the transformer secondary, which secondary is tuned by means of capacitor 78 to the sound carrier frequency.

As noticed in Figure 4, the constant bandwidth coupling circuit of the present invention resides in the series resonant circuits 50 and 58, in combination with the impedance transferring means such as transformer 52 and 60. The resonant frequencies of the two series circuits 50 and 52 will be substantially the same, capacitors 80 and 82 establishing the resonant loop 50 at approximately the same frequency as capacitor 84 establishes the resonant loop 58. Variable capacitors 82 and 84, as well as the variable capacitor 86, associated with the oscillator, are mechanically ganged together as indicated by the dotted lines 88 so that the circuits cooperatively track over the entire television band to produce suitable I. F. frequency output. Resistance and capacitor combination 90 and 92 connected in the cathode circuit of the vacuum tube 54, as well as combination 94 and 96, connected in the cathode circuit of vacuum tube 62, provide means for establishing proper operating biases on the two respective stages. Resistance 98, connected in shunt with the primary of the transformer 56 reduces the Q of the primary to give proper operating bandwidth of the primary. Resistance 100, in combination with the filter capacitor 102 suitably decouples the first R. F. amplifier stage based on tube 54 from the B power supply at terminal 104. Correspondingly, resistance 104 and capacitor 106, suitably decouples plate current variations of the vacuum tube 62 from the B power supply.

In the tuner arrangement of Figure 4, it may be shown that the voltage gain relation between the input voltage supplied by the antenna 46 to the input voltage applied to the cathode circuit of the first R. F. amplifier under conditions of proper antenna match may be expressed as $$\frac{e_a^2}{4r_a}=(e_{k_1})^2 g_1$$

where:

$e_a$ is the open circuit voltage of the antenna;
$r_a$ is the nominal resistance of the antenna 46;
$e_{k_1}$ is the voltage developed across the cathode impedance;
$g_1$ is the cathode admittance of the grounded grid amplifier 54.

This may also be written in the form of:

$$\frac{e_{k_1}}{e_a}=\frac{1}{\sqrt{4r_a g_1}}$$

The actual power transformed by the grounded grid R. F. stage 54 may be expressed as follows:

$$(e_{k_1}g_1)^2 Z_{L_1}=e_{k_2}^2\overline{g_2}$$

where $Z_{L_1}$ is the actual impedance in the anode circuit of the grounded grid amplifier 54; and where $\overline{g_2}$ is the average cathode admittance of the grounded grid amplifier 62 over the oscillator cycle.

The actual cathode voltage gain then would be $$\frac{e_{k_2}}{e_{k_1}}=g_1\sqrt{\frac{Z_{L_1}}{\overline{g_2}}}$$

The voltage gain of the mixer stage 62, would, correspondingly, be $$\frac{e_{if}}{e_{k_2}}=g_c Z_{L_2}$$

where:

$g_c$ is the conversion transconduction of the mixer tube 62,
$Z_{L_2}$ is the impedance of the primary 72 of the I. F. coil 74.

The overall gain $A_0$ from the antenna to the output of the available through capacitor 75 would then be $$A_0=\frac{e_{if}}{e_a}=g_c Z_{L_2}\sqrt{\frac{g_1 Z_{L_1}}{4r_a\overline{g_2}}}$$

For example, with a 6 mc. bandwidth and a corresponding 4,000 ohm plate impedance in each of the vacuum tube with the tubes themselves have a .01 mho transconductance, an overall gain in the order of 30 may be expected.

Through the use of triodes in the tuner unit and the shielding effects of the grounded grid tubes, amplifiers used extremely low noise factors for the tuner outlets employing the present invention may be expected, as well as a relatively low local oscillator radiation.

It will appear from a consideration of the operating principles underlying the present invention that any wiring inductance or tube lead inductance (normally constituting undesirable loss in prior art systems) here becomes a useful part of the tuning inductance in the series resonant input circuit. Evidently, this makes construction of the circuit less critical and generally provides higher operating efficiency. Such an arrangement, using a conventional ganged capacitor, may be made to tune over the whole presently-assigned television band providing at all points on the band, substantially constant bandwidth and selectivity.

Although the present invention has been shown in connection with the particular forms of electronic amplifiers and circuits, it is evident that the basic constant bandpass arrangement may be employed successfully with numerous other types of amplifier circuits provided the input impedance of the amplifier is properly considered as included in the series tuned circuit and regarded in establishing the values of the circuit parameters as taught hereinabove.

Having thus disclosed my invention, what I claim is:

1. In a tunable signal bandwidth network adapted to display a substantially constant bandwidth $\Delta F$ at virtually all its tunable frequencies, the combination of: an inductance of value L, a variable tuning capacitance, an impedance having a resistive component, connections placing said inductance, capacitance and impedance in series with one another to form a series resonant circuit, broad band means for exciting said series resonant circuit with signal energy, said broad band means having an effective band pass characteristic wider than $\Delta F$, and connections for extracting output signal voltage from across said impedance, the value of the resistive component of said impedance being adjusted such that the total effective resistance $R_t$ in said series resonant circuit is substantially equal to $$R_t=2\pi L\Delta F$$

2. A tunable selective high frequency signal communicating system having a substantially constant pass bandwidth over its entire tunable range, said system comprising: a tunable series resonant circuit including an inductive component, a resistive component, and a variable capacitive tuning component, broad band means for exciting said resonant circuit, means for extracting output signals from said resonant circuit in accordance with current flowing therein, the overall effective series resistance R of the resonant circuit being adjusted such that $$R=2\pi L\Delta F$$

where L equals the effective value of total resonant circuit inductance and $\Delta F$ substantially equals the desirable pass bandwidth of the system at any tunable resonant frequency throughout its tunable range and is less than the band pass of said broad band exciting means.

3. A tunable selective high frequency signal communicating system having a substantially constant pass bandwidth over its entire tunable range, said system comprising: a tunable series resonant circuit including an inductive component, a resistive component and a variable capacitance tuning component, a broad band exciting circuit inductively coupled to at least a portion of the inductive component of said resonant circuit, the terminals of said exciting circuit defining low impedance broad band input terminals for applying signal energy to the system, means for extracting output signals from said resonant circuit in accordance with current flowing therein, the overall effective series resistance R of the resonant circuit being adjusted such that $$R=2\pi L\Delta F$$

where L equals the effective value of total resonant circuit inductance and $\Delta F$ substantially equals the desirable pass bandwidth of the system at any tunable resonant frequency throughout its tunable range and is less than the broad band characteristic of said exciting circuit.

4. A tunable constant bandwidth amplifier system for amplifying a predetermined frequency range of intelligence signals, said amplifier system comprising, an amplifier having an input impedance displaying a predetermined resistive component, a series combination of an inductance and a variable capacitance connected in shunt with said amplifier input impedance to define a series resonant circuit, the value and range of said capacitance being chosen such that the series resonant circuit defined by said inductance, said amplifier input impedance and said variable capacitance is tunably resonant by said capacitance over the entire predetermined frequency range of intelligence signals, said inductance being of a value L substantially equal to $$L=\frac{R}{2\pi\Delta F}$$

where R is the total effective series resistance in the defined series resonant circuit while $\Delta F$ is equal to the predetermined desirable constant bandwidth of the tunable amplifier system.

5. Apparatus according to claim 4 wherein the amplifier is of the grounded grid variety having an input cathode impedance exhibiting a preponderance of resistive component over the tunable range of the series resonant circuit whereby said resistive component forms the largest portion of the resistance effectively in series with said resonant circuit.

6. A constant bandwidth amplifier arrangement adapted for selective tuning over a prescribed range of signal frequencies, said amplifier arrangement comprising in combination, a discharge device having at least an anode, cathode and control electrode, a point of reference potential, a galvanically conductive impedance connected from said cathode to said point of reference potential to define a cathode impedance for said amplifier, a substantially direct connection between said control electrode and said point of reference potential, a load impedance connected from said discharge device anode to a point of positive polarizing potential to form an output circuit, a series combination of an inductance and variable capacitance connected in shunt with said cathode impedance to form a series resonant circuit therewith, the values of said inductance, said variable capacitance and said cathode impedance being chosen such that said variable capacitance effectively tunes the resonant frequency of the formed resonant circuit over the prescribed range of signal frequencies, and an input circuit comprising means for exciting the series resonant circuit with signal frequencies.

7. In a superheterodyne radio receiver for receiving a plurality of radio signals falling in a prescribed frequency range, a superheterodyne detector comprising, a discharge device having at least an anode, cathode and control electrode, a point of reference potential, a galvanically conductive impedance connected from said cathode to said point of reference potential, a relatively low value impedance means connected between said control electrode and said point of reference potential, a load impedance connected from said discharge device anode to a point of positive polarizing potential to form an output circuit, a series combination of an inductance and variable capacitance connected in shunt with said galvanically conductive impedance to form a series resonant circuit therewith the values of said inductance, said variable capacitance and said impedance being so chosen that said variable capacitance effectively tunes the resonant frequency of the formed resonant circuit over the prescribed range of radio signal frequencies, an input circuit comprising means for exciting the series resonant circuit with signal frequencies, a source of superheterodyne local oscillator signal, and means including said low value impedance means for applying said local oscillator signal in series with the connection of said control electrode to said point of reference potential.

8. A constant bandwidth amplifier arrangement adapted for selective tuning over a prescribed range of signal frequencies, said amplifier arrangement comprising in combination, a discharge device having at least an anode, cathode, and control electrode, a point of reference potential, a galvanically conductive impedance connected from said cathode to said point of reference potential, a substantially direct connection between said control electrode and said point of reference potential, a load impedance connected from said discharge device anode to a point of positive polarizing potential to form an output circuit, a series combination of an inductance and variable capacitance connected in shunt with said galvanically conductive impedance to form a series resonant circuit therewith, the values of said inductance, said variable capacitance and said impedance being so chosen such that said variable capacitance effectively tunes the resonant frequency of the formed series resonant circuit over the prescribed range of signal frequencies, the total value $L_t$ of effective inductance in the series resonant circuit being defined by $$L_t=\frac{R}{2\pi\Delta F}$$

where R is the total effective series resistance in the formed resonant circuit while $\Delta F$ is equal to the desired constant bandwidth of the amplifier arrangement, and an input circuit comprising means for exciting said formed series resonant circuit with signal frequencies.

9. A superheterodyne type signal detector having a tunable frequency selective input circuit having a predetermined bandwidth over a prescribed range of signal frequencies, said detector comprising a discharge device having at least an anode, cathode and control electrode, a point of reference potential, a galvanically conductive impedance connected from said cathode to said point of reference potential, relatively low value impedance means connected between said control electrode and said point of reference potential, a load impedance connected from said discharge device anode to a point of positive polarizing potential to form an output circuit, a series combination of an inductance and a variable capacitance connected in shunt with said galvanically conductive impedance to form a series resonant circuit therewith, the values of said inductance, said variable capacitance and said impedance being so chosen such that said variable capacitance tunes the formed resonant circuit over the prescribed range of signal frequencies, the total value $L_t$ of effective inductance in the series resonant circuit being defined by $$L_t=\frac{R}{2\pi\Delta F}$$

where R is the total effective series resistance in the formed resonant circuit while $\Delta F$ is equal to the desired constant bandwidth of the superheterodyne detector, an input circuit comprising means for exciting said formed series resonant circuit with signal frequencies, a source of superheterodyne local oscillator, and means including said low value impedance means for applying said local oscillator signal in series with the connection of said control electrode to said point of reference potential.

10. Apparatus according to claim 9 wherein said source of superheterodyne local oscillator signal comprises a Hartley oscillator employing a vacuum tube having its cathode connected through an inductance to said point of reference potential and said means for applying said local oscillator signal to said control electrode comprises a connection from said control electrode to said Hartley oscillator discharge tube cathode.

11. In a tunable selective high frequency signal communication system having a substantially constant bandwidth over its entire tunable range, the combination of: a first broad band amplifier unit having a broad band output circuit, a second amplifier unit having a broad band input circuit, a tunable series resonant circuit including an inductive component, a resistive component, and a variable capacitive tuning component, separate means for inductively coupling said resonant circuit respectively with the output circuit of said first amplifier unit and the input circuit of the second amplifier unit, the effective resistance $R_s$ in the series resonant circuit including said resistive component being determined such that $$R_s = 2\pi L \Delta F$$

where L equals the effective value of the total resonant circuit inductance and ΔF substantially equals the desirable pass bandwidth of the system at any tunable resonant frequency of the series resonant circuit, ΔF being much smaller than the broad band characteristic of said first and second amplifier units.

12. Apparatus according to claim 11 wherein said amplifier is of the cathode-input variety displaying a cathode input impedance of $R_c$ and wherein said inductive means coupling said resonant circuit with said second amplifier input exhibits an impedance transformation ratio N substantially equal to $$N = \sqrt{R_c / R_s}$$

13. In a tunable selective high frequency signal communication system having a substantially constant bandwidth over its entire tunable range, the combination of: a first amplifier unit having an output circuit, a second amplifier unit having an input circuit, a tunable series resonant circuit including an inductive component, a resistive component, and a variable capacitive tuning component, separate means for respectively coupling said resonant circuit with the output circuit of the first amplifier unit and the input circuit of the second amplifier unit, the effective resistance $R_s$ in the series resonant circuit being determined such that $$R_s = 2\pi L \Delta F$$

where L equals the effective value of the total resonant circuit inductance and ΔF substantially equals the desirable pass bandwidth of the system at any tunable resonant frequency of the series resonant circuit.

14. Apparatus according to claim 13 wherein said second amplifier is of the cathode-input variety displaying a cathode input impedance of $R_c$ and wherein said means coupling said resonant circuit with said second amplifier input exhibits an impedance transformation ratio N substantially equal to $$N = \sqrt{R_c / R_s}$$

15. A constant bandwidth amplifier arrangement adapted for selective tuning over a prescribed range of signal frequency, said amplifier arrangement comprising in combination, a discharge tube having at least an anode, a cathode, and a control electrode, said discharge tube having a predetermined plate resistance $r_p$ and a predetermined amplification $\mu$, a point of reference potential, a galvanically conductive impedance connected from said discharge tube cathode to said point of reference potential, a connection between said control electrode and said point of reference potential, a load impedance $Z_L$ connected from said discharge device anode to a point of positive polarizing potential to form an output circuit, a series combination of inductance L and a variable capacitance connected in shunt with said cathode impedance through an impedance transforming means having a predetermined transformation ratio N, the values of said inductance, said variable capacitance and said impedance being so chosen that said variable capacitance effectively tunes the resonant frequency of the formed resonant circuit over the prescribed range of signal frequencies, the transformation ratio N of said impedance transforming means being substantially equal to $$N = \sqrt{R_c / R_s}$$

where $$R_c = \frac{r_p + Z_L}{1 + \mu}$$

and $$R_s = \Delta F 2\pi L$$

in which ΔF is equal to the constant desired bandwidth of the amplifier arrangement, and an input circuit comprising means for exciting the series resonant circuit formed by said inductance and said variable capacitance connected in series with said impedance transforming means.

16. A constant bandwidth amplifier arrangement adapted for selective tuning over a prescribed range of signal frequencies, said amplifier arrangement comprising in combination, a discharge device having at least an anode, a cathode, and a control electrode with a predetermined mutual conductance factor, $g_m$, a point of reference potential, a galvanically conductive impedance connected from said cathode to said point of reference potential, a connection between said control electrode and said point of reference potential, a series combination of an inductance and a variable capacitance connected in shunt with said cathode impedance to form a series resonant circuit, the values of said inductance, and said variable capacitance being so chosen that said variable capacitance effectively tunes the resonant frequency of the formed resonant circuit over the prescribed range of signal frequencies, the value L of said inductance being substantially equal to $$L = \frac{1}{2\pi \Delta F g_m}$$

where ΔF is equal to the constant desired bandpass of the amplifier arrangement, and an input circuit comprising means for exciting the series resonant circuit with signal frequencies.

References Cited in the file of this patent

UNITED STATES PATENTS

| | | |
|---|---|---|
| 2,088,229 | Braden | July 27, 1937 |
| 2,205,075 | Wilhelm | June 18, 1940 |
| 2,262,707 | Farrington | Nov. 11, 1941 |
| 2,361,634 | Koch | Oct. 31, 1944 |
| 2,393,709 | Romander | Jan. 29, 1946 |
| 2,463,229 | Wheeler | Mar. 1, 1949 |
| 2,546,837 | Stribling | Mar. 27, 1951 |
| 2,581,159 | Achenbach | Jan. 1, 1952 |